United States Patent [19]

Ten Pierick et al.

[11] Patent Number: 5,278,476
[45] Date of Patent: Jan. 11, 1994

[54] DISPLAY DEVICE INCLUDING A BLACK LEVEL SETTING CIRCUIT

[75] Inventors: Hendrik Ten Pierick; Willem J. De Haan, both of Eindhoven; Frederik J. De Bruijn, Bilthoven; Dirk J. A. Teuling, Eindhoven, all of Netherlands

[73] Assignee: U.S. Philips Corporation, New York, N.Y.

[21] Appl. No.: 958,607

[22] Filed: Oct. 29, 1992

[30] Foreign Application Priority Data

Nov. 13, 1991 [EP] European Pat. Off. ........ 91202946.9

[51] Int. Cl.$^5$ .......................... G09G 1/04; H01J 29/70
[52] U.S. Cl. ...................................... 315/383; 315/387
[58] Field of Search ................. 315/381, 383, 387, 386

[56] References Cited

U.S. PATENT DOCUMENTS

| | | | |
|---|---|---|---|
| 4,370,674 | 1/1983 | Johnson et al. | 358/74 |
| 4,698,557 | 10/1987 | Harlos | 315/383 |
| 4,705,992 | 11/1987 | Ciocan | 315/383 |
| 5,107,189 | 4/1992 | Page | 315/383 |

Primary Examiner—Gregory C. Issing
Attorney, Agent, or Firm—Edward W. Goodman

[57] ABSTRACT

One of the problems in display devices is that the black level is different for each type of display tube and is also dependent on temperature and ageing. The display devices hitherto known with black level setting circuits apply one control voltage to the relevant cathode during the field blanking interval, whereafter the cathode current is measured and subsequently compared with a reference current. Subsequently, the black level is adapted until the measured current approximately corresponds to the reference current.

The display device now includes a black level setting circuit with a control circuit adapted to successively apply at least two control voltages in a predetermined ratio to the cathode. Moreover, the black level setting circuit includes a correction circuit for supplying a correction value dependent on the ratio between the currents generated in the relevant cathode in response to the at least two control voltages.

9 Claims, 1 Drawing Sheet

DISPLAY DEVICE INCLUDING A BLACK LEVEL SETTING CIRCUIT

BACKGROUND OF THE INVENTION

1. Field of the Invention

The invention relates to a display device comprising a display tube having at least one cathode, and a black level setting circuit for setting the black level of a video signal to be applied to the cathode, said black level setting circuit comprising a correction circuit for correcting the black level and for supplying a correction value for the cathode, control means for applying a predetermined control signal to the cathode during a measuring interval, and a measuring circuit for measuring a current generated in the cathode by the control signal, said measuring circuit having an output which is coupled to an input of the correction circuit.

At a voltage of 0 V at the cathode (with respect to the first control grid), a given current flows in the cathode. If the voltage increases, the current decreases until the current becomes zero. This is referred to as the cut-off point. The problem occurring when controlling the display tube is that the control is to be effected from the cut-off point. The cut-off point of a display tube is difficult to determine, certainly if this is to be effected automatically. If there is no control voltage, the voltage at the cathode must be equal to the cut-off voltage, thus just precluding the flow of beam current. The black level setting circuit is used to render the black level equal to the cut-off voltage.

2. Description of the Related Art

A display device of this type is known from Valvo Technische Information of Jul. 19, 1985 "Die Video-Kombination TDA 4580". At the black level setting circuit in this known display device, a fixed control voltage is applied as a control signal to the relevant cathode for each color during one measuring line in the field retrace interval. The cathode current Ik is measured and compared with a reference current Iref. The black level is corrected until the cathode current is equal to the reference current. In this way the black level is set close to the cut-off voltage.

A drawback of this known display device is that the black level of the amplifier never corresponds exactly to the cut-off point of the display tube.

The invention is based on the recognition that the relation between the cathode, current Ik and the control voltage $V_D$ (i.e. the voltage applied to the cathode, sent in a negative direction from the cut-off point) is approximately as follows:

$$Ik = \left( \frac{K \cdot V_D}{V_{co}^{(1-\frac{1.5}{\gamma})}} \right) \gamma$$

The cathode current Ik is dependent on the cut-off voltage Vco and on $\gamma$. $\gamma$ is a quantity related to the display tube. Among the different cathodes for the colors (R, G, B) in one display tube, the cut-off voltage may have different values varying, for example between 105 and 130 Volts. One reference current for one display tube is thus insufficient. Moreover, the cut-off points also vary due to heating, ageing, etc. The reference current should then vary accordingly.

In the above-mentioned black level setting circuit, $\gamma$ is required as an input parameter and will therefore have to be measured and taken into account for each type of display tube.

SUMMARY OF THE INVENTION

It is, inter alia, an object of the invention to eliminate the above-mentioned drawbacks. To this end, a display device according to the invention is characterized in that the control means are adapted to successively apply at least two control voltages in a predetermined ratio to the cathode, and in that the correction circuit is adapted to supply a correction value in dependence upon the ratio between currents generated in the cathode in response to said at least two control voltages.

The absolute values of the currents are no longer important because the ratios of the measured currents instead of the measured currents are taken into account in the computations of the correction values. The absolute values of the applied voltages are no longer important either, provided that they are within the range of the relevant display tube.

An embodiment of a display device according to the invention is characterized in that the black level setting circuit successively applies three control voltages in a known ratio to the cathode in three measuring intervals and in that the measuring circuit measures the three respective currents and corrects the black level with reference to the known ratio of the control voltages.

By successively applying three control voltages to each cathode, $\gamma$ is no longer necessary as an input parameter. Now, after the black level has just been set, $\gamma$ is available as a parameter and may be used, if necessary, in another section of the display device.

An embodiment of a display device according to the invention is characterized in that the video signal is applied to the black level setting circuit via a multiplier circuit which multiplies the video signal by a factor which is dependent on the black level and a reference black level.

By interpositioning this multiplier circuit, the cathode currents for the three different cathodes are rendered equal.

A further embodiment of a display device according to the invention is characterized in that the black level setting circuit is coupled to a Vg2 correction circuit, which Vg2 correction circuit defines a corrected Vg2 voltage with reference to the black level and a reference voltage.

By varying the voltage at the second grid G2 of the electron gun, the cut-off point can be set to a reference voltage associated with the relevant display tube so that an optimum spot size of an electron beam is obtained on the screen.

A further embodiment of a display device according to the invention is characterized in that the Vg2 correction circuit is coupled to the black level setting circuit via a comparison circuit, which comparison circuit determines the highest voltage of the three black levels and applies said voltage to the Vg2 correction circuit which compares said highest voltage with the reference voltage and with an old value of the Vg2 voltage and determines the corrected Vg2 voltage on the basis of this comparison.

By comparing the highest voltage of the three black levels with the reference voltage and adapting the voltage at the second grid on the basis of this comparison, it can be ensured that the spot has an optimum size.

BRIEF DESCRIPTION OF THE DRAWING

The invention will be described in greater detail by way of example with reference to the accompanying drawings in which.

DESCRIPTION OF THE PREFERRED EMBODIMENT

Figure 1:
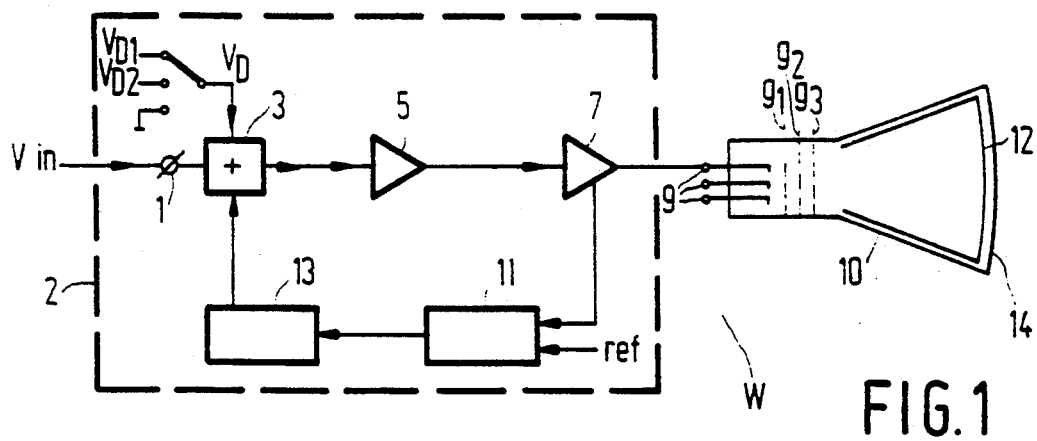
FIG. 1 is a block diagram of a display device including a black level setting circuit according to the invention.

FIG. 1 shows a display device W including a black level setting circuit 2 which receives a video signal at an input 1 and applies a video signal suitable for a display tube 10 to cathodes 9. The cathodes 9 generate electron currents drawn to narrow beams through grids G1 and G2. Subsequently, the beams pass a third grid G3 which focuses the beam, whereafter the beams are deflected to given positions on a display screen 14 via a shadow mask 12 by means of deflection coils (not shown).

FIG. 1 also shows a block diagram of the black level setting circuit 2. A separate black level setting circuit is provided for each color (R, G, B), hence for each cathode. The circuit receives a video signal for one of the three cathodes at an input 1. This signal is applied to an input of an adder circuit 3. An output of the adder circuit is connected to a video output stage 7 via a buffer circuit 5. An output of the video output stage is connected to a cathode 9. The elements 3, 5 and 7 constitute the drive means for driving the cathode/cathodes. A second output of the video output stage, which supplies information about the output current supplied via the first output, is connected to a measuring circuit 11. The measuring circuit receives a reference signal ref at a second input. An output of the measuring circuit is connected to a correction circuit 13, which correction circuit has an output coupled to a second input of the adder circuit 3.

The black level setting circuit 2 operates as follows. During the field retrace interval, two control voltages ($V_D$) are successively applied to the black level setting circuit at a third input of the adder circuit 3. The two control voltages have a fixed known ratio (a). During a first measuring interval (for example, one measuring line), a first control voltage ($V_{D1}$) is applied to the adder circuit. The first input of the measuring circuit 11 receives a signal which corresponds to the current ($Ik(V_{D1})$) supplied by the video output stage 7. This signal is stored in the measuring circuit, whereafter the second control voltage ($V_{D2}=a*V_{D1}$) is applied to the adder circuit during a second measuring interval. Also the cathode current ($Ik(V_{D2})$) generated by this control voltage is measured in the measuring circuit.

Subsequently, the ratio of $Ik(V_{D1})$ and $Ik(V_{D2})$ is determined and this ratio is compared with the reference value ref. The reference value ref is equal to the ratio of the two control voltages (a) to the power $\gamma$ $$ref = a^\gamma$$

It follows from the previously given formula for Ik that the black level is maintained at the desired constant value if the ratio of $Ik(V_{D1})$ and $Ik(V_{D2}n)$ is equal to the reference value ref. The measuring circuit 11 applies a signal to the correction circuit 13, dependent on the measured ratio. This signal indicates whether the black level must be increased or decreased, but the extent of the variation cannot be derived from this computation. In the case of an incorrect ratio the correction circuit corrects the black level, whereafter the currents must be measured again during the next field retrace interval and the ratio is computed so as to continuously check the black level and correct it, if necessary.

A voltage reference as is required in the known black level setting circuits is not required in this embodiment.

Since the reference signal depends on $\gamma$, this embodiment is not universally applicable but $\gamma$ will have to be known for each type of display tube so as to be able to set the black level satisfactorily.

Since the ratio of the two measured currents is compared with the reference signal, it is in principle unnecessary to apply the complete currents to the measuring circuit. It is alternatively possible to use a part of the currents, omitting one factor in the ratio.

In these measurements it is assumed that there are no leakage currents. If there are leakage currents, the leakage current for the three cathodes will have to be compensated for before the "real" measurements are started.

Figure 2:
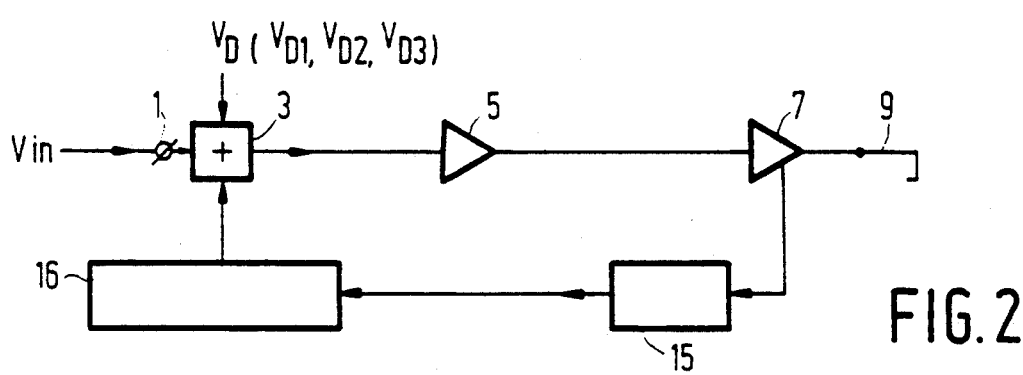
FIG. 2 is a block diagram of a preferred embodiment of a black level setting circuit in a display device according to the invention.

FIG. 2 shows a preferred embodiment of a black level setting circuit 2. An input 1 of the circuit similarly receives the video signal required for the relevant cathode. This signal is also applied to a first input of the adder circuit 3, an output of which is connected to the video output stage 7 via a buffer circuit 5. The first output of the video output stage is again connected to the cathode 9. The second output of the video output stage again supplies a signal having the value of the cathode current or a linear part thereof. This signal is applied to a measuring circuit 15 which supplies a signal, dependent on the measured results. This measuring circuit measures the cathode current (Ik1, Ik2 and Ik3) in three measuring intervals (for example, three successive measuring lines) at three different control voltages ($V_{D1}$, $V_{D2}$ and $V_{D3}$), while the control voltages have a fixed ratio. The measuring circuit applies a signal to a correction circuit 16, dependent on the measured cathode currents, hence dependent on the measured black level.

By using three measuring lines instead of two measuring lines and thus measuring three values of the cathode current, this yields an extra comparison so that $\gamma$ is no longer necessary as an input parameter. $\gamma$ is now available as a parameter after the black level has been set correctly. If the black level has been set correctly, the ratios of the currents have a fixed value, viz. the ratio between the relevant control voltages and the power $\gamma$.

$$\frac{Ik2}{Ik1} = \frac{\left(\frac{K*V_{D2}}{V_{co}^{(1-\frac{1.5}{\gamma})}}\right)^\gamma}{\left(\frac{K*V_{D1}}{V_{co}^{(1-\frac{1.5}{\gamma})}}\right)^\gamma} = \left(\frac{V_{D2}}{V_{D1}}\right)^\gamma$$

$$\frac{Ik3}{Ik1} = \left(\frac{V_{D3}}{V_{D1}}\right)^\gamma$$

-continued $$\frac{Ik3}{Ik2} = \left(\frac{V_{D3}}{V_{D2}}\right)\gamma$$

$$\frac{\log\left(\frac{Ik2}{Ik1}\right)}{\log\left(\frac{V_{D2}}{V_{D1}}\right)} = \gamma = \frac{\log\left(\frac{Ik3}{Ik1}\right)}{\log\left(\frac{V_{D3}}{V_{D1}}\right)} = \frac{\log\left(\frac{Ik3}{Ik2}\right)}{\log\left(\frac{V_{D3}}{V_{D1}}\right)}$$

By comparing the ratios with each other, information can be obtained about the way in which the black level must be corrected. Similarly as in the block diagram of FIG. 1, the ratios of the control voltages are chosen to have fixed values again (for example $V_{D2}=a^*V_{D1}, V_{D3}=a^*V_{D2}, a>1$).

If the black level is set correctly, this yields:

$Ik2/Ik1 = Ik3/Ik2$

The black level is too low if Ik2/Ik1 > Ik3/Ik2, and too high if Ik2/Ik1 < Ik3/Ik2. Thus, it is known after this measurement whether the black level should be increased or decreased. The correction circuit 16 applies a correction signal to the adder circuit 3. During the next field retrace interval, three control voltages are successively applied again to the cathode during three measuring intervals and the black level is checked and, if necessary, corrected via the measuring circuit and the correction circuit.

Figure 3:
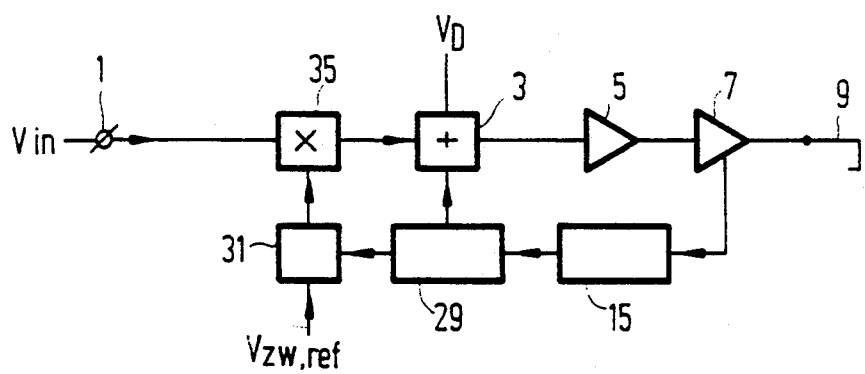
FIG. 3 is a block diagram of a black level setting circuit using gain control.

FIG. 3 shows a block diagram of a black level setting circuit in which a multiplier circuit is arranged between the input 1 and the first input of the adder circuit 3. The multiplier circuit 35 multiplies the incoming signal by a factor $$\left(\frac{Vzw}{Vzw,\text{ref}}\right)^{(1-\frac{1.5}{\gamma})}$$

The voltage Vz is the voltage of the black level as set by means of the black level setting circuit. The voltage Vref is the optimum voltage for the black level, i.e. the optimum black level voltage associated with the relevant display tube. This factor yields a gain control, which control ensures that an arbitrary video voltage applied to the input 1 yields the same cathode current for the three electron guns (cathodes), provided that the factors K and γ are equal for the three cathodes.

An advantage of this circuit is that a variation of luminance is also corrected by the electron gun and the grids within the lifetime of the device.

The black level setting circuit described above is identical for the three cathodes R, G and B. The measuring circuit 15 may be combined for the three black level setting circuits.

Figure 4:
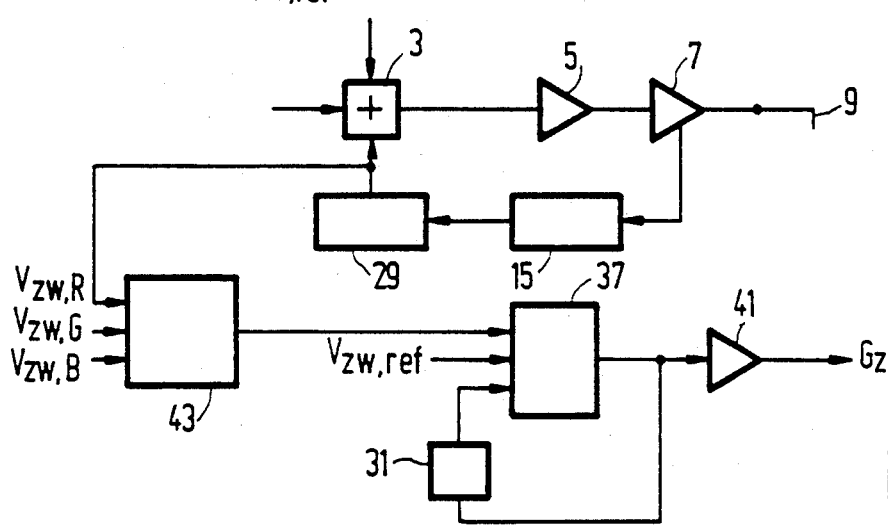
FIG. 4 is a block diagram of a black level setting circuit using Vg2 control.

FIG. 4 shows a block diagram of a black level setting circuit, combined with a Vg2 control. G2 denotes the second grid in the electron gun. The spot size of the screen can be influenced by means of the voltage Vg2 at this grid. By varying the voltage Vg2 at the second grid, the cut-off voltage Vco also varies. By incorporating the voltage Vg2 in a control loop, a drift of the cut-off voltage can be compensated for. FIG. 4 shows a part of the block diagram of the black level setting circuit shown in FIG. 3, in which the control loop constituted by the circuits 3, 5, 7, 15 and 29 operates in the same way as in FIG. 3. The correction circuit 29 applies a voltage Vzw to the adder circuit 3, which voltage corresponds to the cut-off voltage Vco after a period of time has elapsed.

The output of the correction circuit 29 is also connected to a comparison stage 43. This comparison stage compares the voltages Vzw (Vzw,R, Vzw,G, Vzw,B) for the three cathodes (R, G, B) and applies the highest of these three voltages to an input of a Vg2 correction circuit 37 for computing a new Vg2 voltage (Vg2,new). A second input of this circuit receives a reference voltage (Vzw,ref) which corresponds to the cut-off voltage value at which the spot has an optimum size. A third input of the Vg2 correction circuit 37 receives an old value of the Vg2 voltage (Vg2,old) which is stored in a memory element 39. The Vg2 correction circuit defines the new value of the Vg2 voltage with reference to the formula $$Vg2,\text{new} = \frac{Vg2,\text{old}^*Vzw,\text{ref}}{Vzw}$$

This new value is applied to the second grid G2 via an amplifier 41.

Due to this correction of the Vg2 voltage, the cut-off voltage Vco is rendered equal to, or set at least as close as possible to the reference voltage Vzw,ref. The reference voltage Vzw,ref is a voltage which is different for each type of display tube and is necessary as an input parameter for the Vg2 correction.

The Vg2 correction circuit described with reference to FIG. 4 may be used independently of the black level setting circuit. As described hereinbefore, the Vg2 correction circuit determines the highest of the three black levels (hence the highest of the three cut-off voltages) and controls the Vg2 voltage on the basis of this information in such a way that the spot has an optimum size.

We claim:

1. A display device comprising a display tube having at least one cathode and a black level setting circuit for setting the black level of a video signal to be applied to the cathode, said black level setting circuit comprising a correction circuit for correcting the black level and for supplying a correction value for the cathode, control means for applying a predetermined control signal to the cathode during a measuring interval, and a measuring circuit for measuring a current generated in the cathode by the control signal, said measuring circuit having an output which is coupled to an input of the correction circuit, characterized in that the control means are adapted to successively apply at least two control voltages in a predetermined ratio to the cathode, and in that the correction circuit is adapted to supply a correction value in dependence upon the ratio between currents generated in the cathode in response to said at least two control voltages.

2. A display device as claimed in claim 1, characterized in that the black level setting circuit successively applies three control voltages in a known ratio to the cathode in three measuring intervals and in that the measuring circuit measures the three respective currents and corrects the black level with reference to the known ratio of the control voltages.

3. A display device as claimed in claim 2, characterized in that the video signal is applied to the black level setting circuit via a multiplier circuit which multiplies the video signal by a factor which is dependent on the black level and a reference black level.

4. A display device as claimed in claim 1, characterized in that the black level setting circuit is coupled to a Vg2 correction circuit, which Vg2 correction circuit defines a corrected Vg2 voltage with reference to the black level and a reference voltage.

5. A display device as claimed in claim 4, which display device comprises three cathodes, characterized in that the Vg2 correction circuit is coupled to the black level setting circuit via a comparison circuit, which comparison circuit determines the highest voltage of the three black levels and applies said voltage to the Vg2 correction circuit which compares said highest voltage with the reference voltage and with an old value of the Vg2 voltage and determines the corrected Vg2 voltage on the basis of this comparison.

6. A display device as claimed in claim 2, characterized in that the black level setting circuit is coupled to a Vg2 correction circuit, which Vg2 correction circuit defines a corrected Vg2 votlage with reference to the black level and a reference voltage.

7. A display device as claimed in claim 3, characterized in that the black level setting circuit is coupled to a Vg2 correction circuit, which Vg2 correction circuit defines a corrected Vg2 votlage with reference to the black level and a reference voltage.

8. A display device as claimed in claim 6, which display device comprises three cathodes, characterized in that the Vg2 correction circuit is coupled to the black level setting circuit via a comparison circuit, which comparison circuit determines the highest voltage of the three black levels and applies said voltage to the Vg2 correction circuit which compares said highest voltage with the reference voltage and with an old value of the Vg2 voltage and determines the corrected Vg2 voltage on the basis of this comparison.

9. A display device as claimed in claim 7, which display device comprises three cathodes, characterized in that the Vg2 correction circuit is coupled to the black level setting circuit via a comparison circuit, which comparison circuit determines the highest voltage of the three black levels and applies said voltage to the Vg2 correction circuit which compares said highest voltage with the reference voltage and with an old value of the Vg2 voltage and determines the corrected Vg2 voltage on the basis of this comparison.

* * * * *